United States Patent [19]

Sedlar et al.

[11] 3,896,690

[45] July 29, 1975

[54] FRONT RELEASABLE, QUICK-CHANGE TOOL HOLDER FOR AN ORBITING CRANKSHAFT LATHE GIRT

[75] Inventors: Anthony E. Sedlar; Donald E. Roseberry, both of Saginaw, Mich.

[73] Assignee: The Wickes Corporation, San Diego, Calif.

[22] Filed: Dec. 26, 1973

[21] Appl. No.: 428,200

[52] U.S. Cl. ............................................. 82/36 B
[51] Int. Cl. ............................................ B23b 29/00
[58] Field of Search .......... 82/35, 36 A, 36 B, 36 R, 82/37, 38; 29/97

[56] References Cited
UNITED STATES PATENTS

| | | | |
|---|---|---|---|
| 1,919,738 | 7/1933 | Melliag | 82/9 X |
| 1,959,140 | 5/1931 | Peterson | 82/35 R |
| 2,154,739 | 4/1939 | Floeter | 82/9 X |
| 3,785,228 | 1/1974 | Claggett et al. | 82/36 B |

Primary Examiner—Harrison L. Hinson
Attorney, Agent, or Firm—Learman & McCulloch

[57] ABSTRACT

A tool holder and girt assembly wherein a tool holder is mounted for fore and aft movement on a front-to-rear extending exterior girt way which is perpendicular to the crankshaft axis of rotation. It is secured in position by a clamp member which anchors the tool holder in machining position on the girt way. The tool holder has a part mating with said way and when the clamp member is backed off may be simply bodily removed from the way in a forward and upward path.

10 Claims, 5 Drawing Figures

FRONT RELEASABLE, QUICK-CHANGE TOOL HOLDER FOR AN ORBITING CRANKSHAFT LATHE GIRT

BACKGROUND OF THE INVENTION

In orbiting crankshaft lathes of the character to which this invention relates, it has been the practice, when tool bits are to be replaced and reground or discarded, to remove the entire tool holder and transfer it to a bench to facilitate the exact realignment of the cutting edges of the multiple tools which are employed. The tool holders, when mounted in position on orbiting girts provided on the lathe, are necessarily positioned closely to spacer plates on either side of each girt which guide the girts in their orbiting path of travel. This, particularly on lathes for machining the smaller crankshafts, has restricted access to the sides of the tool holders and, since such tool holders have been adjusted to precise lateral positions by set screws located in the sides of the tool holder, it has been difficult to reposition tool holders which have been removed and are to be restored to position. The replacement operation has been time-consuming and, as a result, the machines have had more "down" time than is desirable. This has been a particular problem when "cheeking" cuts are being taken and the tool bits require frequent replacement. More recently a new construction described and claimed in the present assignee's copending application Ser. No. 255,444, filed May 22, 1972 and entitled "Front Releasable, Laterally Clamping, Quick-Change Tool Holder for an Orbiting Crankshaft Lathe Girt," has been suggested to obviate these problems. The construction described and claimed herein is an improved device of the character disclosed in the aforesaid application.

One of the prime objects of the present invention is to design an improved tool holder which mounts on a front-to-rear extending way and can always be precisely returned to the same position. With the present construction, one tool holder may be bodily removed from the way for the purpose of changing its tool bits, and another substituted for it, without any need for realignment of the replacement tool holder.

A further object of the invention is to provide an improved front releasable tool holder which permits clamping of the tool holder to a fore and aft way provided on the girt support, without any need for access to the sides of the girt to release the tool holder.

Still another object of the invention is to provide an improved assembly of the character described which is more economical to manufacture and assemble, while still being highly reliable in operation.

Other objects and advantages of the invention will be pointed out specifically or will become apparent from the following description when it is considered in conjunction with the appended claims and the accompanying drawings, in which:

Referring now more particularly to the accompanying drawings, the girt, shown at 10, is provided for mounting a tool holder, generally designated H, for machining one of the orbiting crank pins 11 of a multiple throw crankshaft to be machined. It is to be understood that the girt 10 is only one of a series of transversely spaced girts which are also being orbited in correlation with the orbit of like crank pins on master crankshafts on a crankshaft lathe. For example, a typical crankshaft being machined may have six throws and heavy crankshafts may weigh in the neighborhood of several hundred pounds. When such crankshafts are being machined, heavy reactive forces or thrusts are generated and the tool mount assembly must be extremely rigid and stable, and capable of absorbing the heavy counter forces. The tool holders must be so mounted in position that they do not move under machining pressures. Machines of the character with which the present assembly is used as illustrated in U.S. Pat. Nos. 1,919,738 and 2,421,147, for instance, and in the present assignee's copending patent application Ser. No. 255,445, filed May 22, 1972, entitled "Orbital Crankshaft Lathe," which is incorporated herein by reference.

Figure 1:
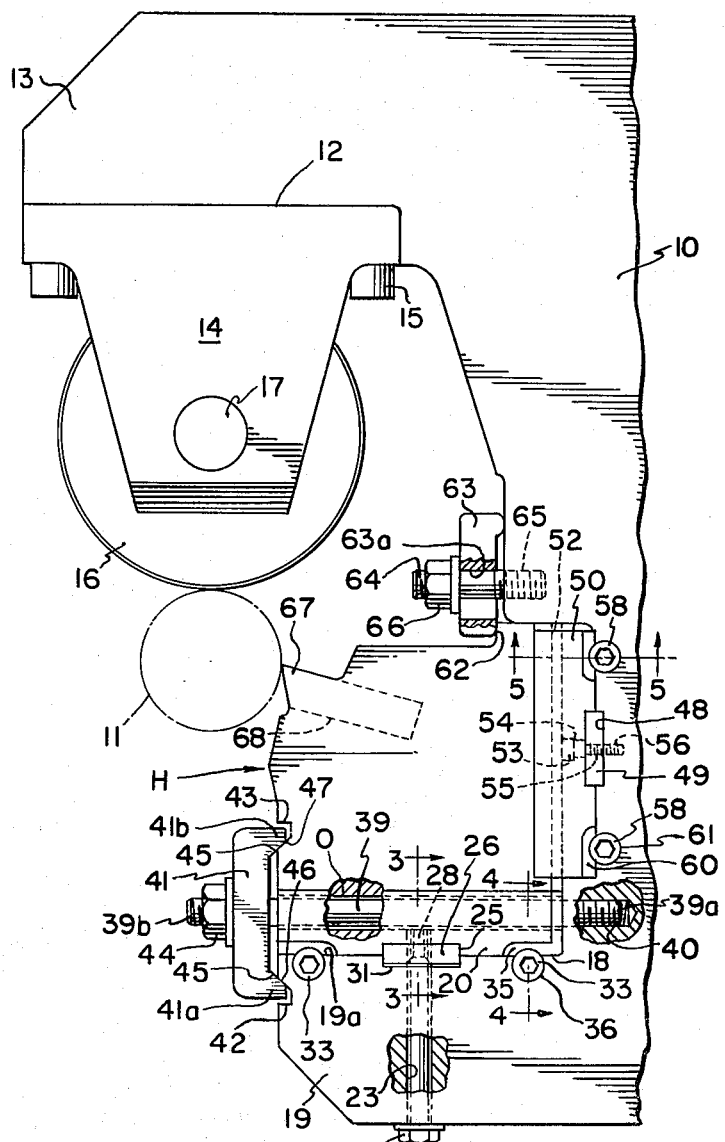
FIG. 1 is a side elevational view of the assembly, parts being broken away to particularly illustrate the manner in which the tool holder is clamped in position. An orbiting crank pin of the crankshaft being machined is shown schematically.
Figure 2:
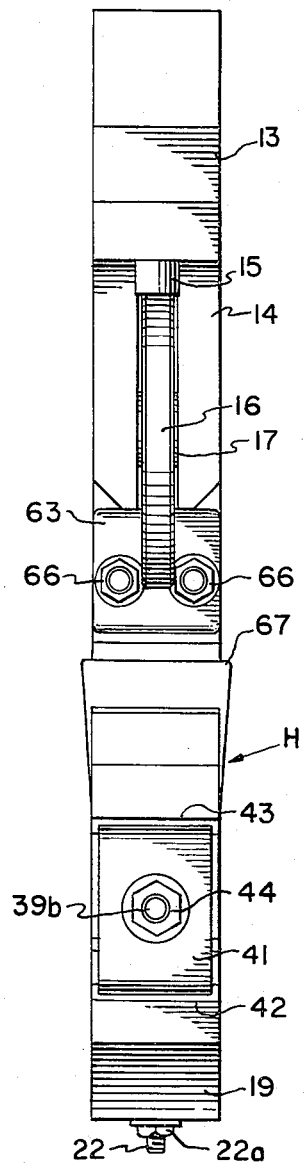
FIG. 2 is a front elevational view thereof.

As FIG. 1 illustrates, each girt 10 is recessed at its front end as at 12, and includes an overhanging upper arm portion 13 for mounting a roller holder 14 which may be bolted in position as at 15. The roller 16, which is carried by the support 14, is mounted on a roller pin 17 in the usual manner. At its lower end, the front end of the girt 10 is recessed as at 18 to provide a tool holder support portion 19. Mounted on the platform surface 19a of support portion 19, is a way part 20 having a bisecting, partly cylindrical, front-to-rear extending recess or groove 21 in its upward facing, V-shaped way portion 20a.

Figure 3:
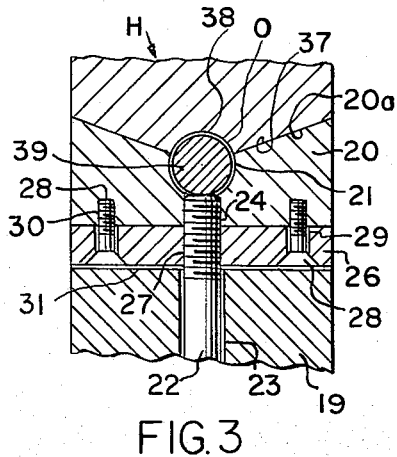
FIG. 3 is an enlarged, transverse sectional view taken on the line 3—3 of FIG. 1.

Clamping of the way part 20 to the tool holder support 19 is effected by a threaded stud member 22 which extends up through an enlarged (relative to stud 22) bore or passage 23 in the arm support 19 into a threaded opening 24 provided in the way part 20. It will be seen that the way part 20 is recessed intermediate its ends as at 25 (FIG. 1) to receive a guide block 26 which has a threaded opening 27 aligned axially with the openings 23 and 24. The guide block 26, which facilitates lateral adjustment of the way part 20 and is secured to the way part 20 by screws 28 (see FIG. 3) passing through enlarged openings 29 in the block 26 into threaded openings 30 provided in the lower part of way block 20, is received in a guideway 31 which extends laterally through the support arm 19 from one side thereof to the other.

Figure 4:
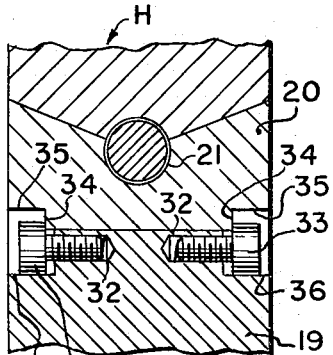
FIG. 4 is a similarly enlarged, transverse sectional view taken on the line 4—4 of FIG. 1.

As FIG. 4 indicates, opposed threaded openings 32 are provided at the front and rear ends of arm 19 to accommodate set screws 33 which engage laterally protruding shoulders 34, provided on the way part 20 by recessing the way part 20 slightly less at 35 than the arm part 19 is recessed at 36. Once the way part 20 is adjusted laterally to the position desired, the lock nut 22a on stud 22 may be tightened down to clamp the way part 20 in laterally adjusted position.

The tool holder H at its bottom is V-shaped as at 37 to mate with the V-shaped surface 20a of way part 20 (FIG. 3) and similarly is bisected by a partly cylindrical groove or recess 38 which mates with the recess 21 to form a cylindrical opening O. It will be observed that more of the composite cylindrical opening O formed is provided in the way part 20 than in the lower end of tool holder H. The composite opening O, which is formed, is enlarged relative to, and freely passes, a front-to-rear extending stud 39 having an inner threaded end 39a which is received by the threaded opening 40 provided in the girt 10. A clamp plate 41 has foot portions 41a and 41b, received in front recesses 2 and 43 provided in the support arm 19 and the tool holder H respectively, and a clamp nut 44, provided on the threaded front end 39b of stud 39, may be tightened down to bear against the clamp plate 41 and force it in a direction toward the girt 10 to clamp tool holder H against the girt 10. Complementary wedge surfaces 45, provided on the feet 41a and 41b, and on the arm 19 at 46 and tool holder H at 47, enhance the clamping action of clamp plate 41.

At the rear upper portion of its tool holder receiving recess 18 each girt 10 is further inwardly recessed as at 48 to provide a lateral guideway extending from one side of the girt 10 to the other which receives the guide block 49 mounted on a locator member 50. The part 50 (FIG. 5) comprises a way, having a V-shaped surface 51 which receives the V-shaped surface 52 of the rear face of tool holder H, and a clamp bolt 53 extends through an enlarged opening 54 in way part 50 and into threaded openings 55 and 56 provided respectively in the block 49 and girt 10.

Figure 5:
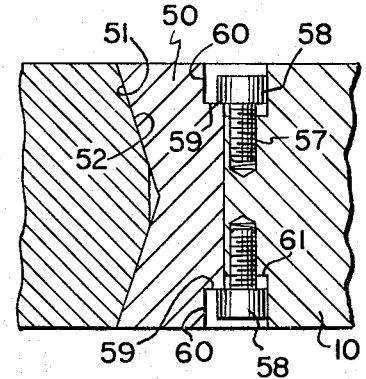
FIG. 5 is an enlarged, sectional inverse plan view taken on the line 5—5 of FIG. 1.

Opposed threaded openings 57 (FIG. 5 in the sides of the girt 10 accommodate set screws or set bolts 58 which are provided to facilitate laterally locating the way part 50 in position. The heads of the set screws or bolts 58 bear against laterally protruding shoulders 59 provided by recessing the way part 50 less at 60 than the girt 10 is recessed at 61.

Provided outwardly of the locator way 50 on the tool holder H is a shoulder surface 62 (FIG. 1) which is engaged by a clamp plate 63 secured in position by threaded stud members 64 which extend through vertically enlarged openings 63a in the clamp plate 63 and into threaded openings 65 provided in the girt 10. Lock nuts 66 may be tightened down on the threaded stud 64 to secure the clamp plate 63 in the position in which it is shown in FIG. 1.

In operation, to properly mount the tool holder H, which comes with its tool bit 67 already present in position in opening 68, is a relatively simple manner. With the set screws 33 and 58 backed off, and the nuts 37, 44, 53 and 66 also backed off, and the clamp plates 41 and 63 disengaged, the tool holder H is moved forwardly until the V-shaped locator surface 52 is fully engaged in way locator surface 51, and V-shaped surfaces 37 and 20a are fully engaged over their front to rear length. Manipulation of the set screws 33 and 58 will properly laterally locate the ways 20 and 50, respectively, after which the nut 37 and bolt 53 can be tightened down to secure the ways 20 and 50 in laterally adjusted position. Once lateral adjustment is effected, the nuts 44 and 66 can be tightened down to clamp the plates 41 and 63 in the position shown in FIG. 1, the clamp plate 63 first being moved downwardly from a position in which it does not engage shoulder 62 to a position in which it does, as shown in FIG. 1.

When the tool bit 67 as been sufficiently worn that regrinding is necessary, it is a simple matter to loosen nuts 44 and 66 so that clamp plate 63 may be moved upwardly to a position above shoulder 62 and clamp plate 41 may be backed off. The tool holder H to be replaced can then simply be lifted upwardly away from clamp stud 39 and way 20 and moved away from the way part 50, and a new tool holder H immediately reinserted in the manner indicated, without any need for lateral adjustment of the parts for the machining operation to proceed.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. A tool holder and girt assembly comprising:
    an orbital girt providing a support platform on which a tool holder may be mounted;
    said platform having a front to rear extending upper exterior way with convergent surfaces thereon;
    a tool holder with a tool bit at one end having a bottom mating way part with convergent surfaces, normally received by said way so as to be freely lifted bodily upwardly away therefrom; and
    front to rear extending clamp means manipulatable from the tool bit end of the holder to releasably clamp the holder and the way in assembled position.

2. The combination defined in claim 1 in which said way is mounted on said platform in a manner to permit its lateral adjustment thereon; and releasable means is provided for securing the way in position once lateral adjustment has been effected.

3. The combination defined in claim 1 in which a vertical opening is provided in said platform and a clamp member of reduced diameter relative to said opening extends from said opening into said way.

4. The combination defined in claim 3 in which opposed laterally adjustable means are provided for positioning said way.

5. The combination defined in claim 2 in which a locator member is provided on said girt at a spaced distance above said way for receiving the opposite end of said tool holder;
    means is provided for laterally adjusting said locator member; and
    releasable means is provided for securing the locator member in position once lateral adjustment has been completed.

6. The combination defined in claim 5 in which clamp means mounted on said girt above said locator member is releasably provided for clamping the upper front end portion of said tool holder to said girt.

7. The combination defined in claim 1 in which said way comprises a V-shaped upper surface broken centrally by a partly cylindrical clamp bolt receiving recess; and said mating way part comprises a mating V-shaped surface also broken by a mating partly cylindrical clamp bolt receiving recess; and a clamp bolt device received in said recesses so that said mating way part can be simply lifted off said way when the clamp bolt device is backed off.

8. The combination defined in claim 1 in which said clamp means has a front mounted clamp plate spanning said platform and tool holder with surfaces reactable between said platform and tool holder to exert forces vertically to clamp both in position when the clamp bolt device is tightened down.

9. The combination of claim 1 in which said releasable means for releasably fixing said actuator means comprises nut means; said stud being threaded at its front end to receive said nut means; and a clamp plate having wedge surface thereon is reactable with said platform and tool holder to exert component forces vertically to clamp said tool holder to said platform.

10. The combination of claim 5 in which said girt is recessed interjacent its sides to receive said locator member; said locator member comprising a block which is laterally adjustable in the recess which receives it; and a mating shape is provided on said tool holder to be received by said locator block.

* * * * *